April 11, 1944.    R. H. WILBUR    2,346,342

PERPETUAL CALENDAR AND MEMORANDUM

Filed Oct. 7, 1940

Inventor
Ralph H. Wilbur
by Nathaniel P. Wharton
Atty.

Patented Apr. 11, 1944

2,346,342

UNITED STATES PATENT OFFICE 2,346,342

PERPETUAL CALENDAR AND MEMORANDUM

Ralph H. Wilbur, Melrose, Mass., assignor to The Tudor Press, Inc., Boston, Mass., a corporation of Massachusetts Application October 7, 1940, Serial No. 360,090

4 Claims. (Cl. 40—109)

This invention relates to a perpetual calendar and memorandum on which a record may be kept of events and anniversaries, the calendar being adjustable to show the days of the week corresponding to the days of the month year after year.

It is an object of the invention to provide a perpetual calendar which is simple in construction and can be inexpensively manufactured. The invention may be embodied in a number of sheets each of which has printed thereon the name or names of one or more of the months of the year together with a vertical column of figures representing the days of the month. Parallel with each such column of figures and closely adjacent thereto is a vertically adjustable strip bearing the names (or abbreviations) of the days of the week in order, the sequence being repeated a sufficient number of times to provide days of the week next to all of the days of the month for any adjustment of the strip.

For a more complete understanding of the invention, reference may be had to the description thereof which follows, and to the drawing of which Fig. 1 is a perspective view of a device embodying the invention.

Figure 1:
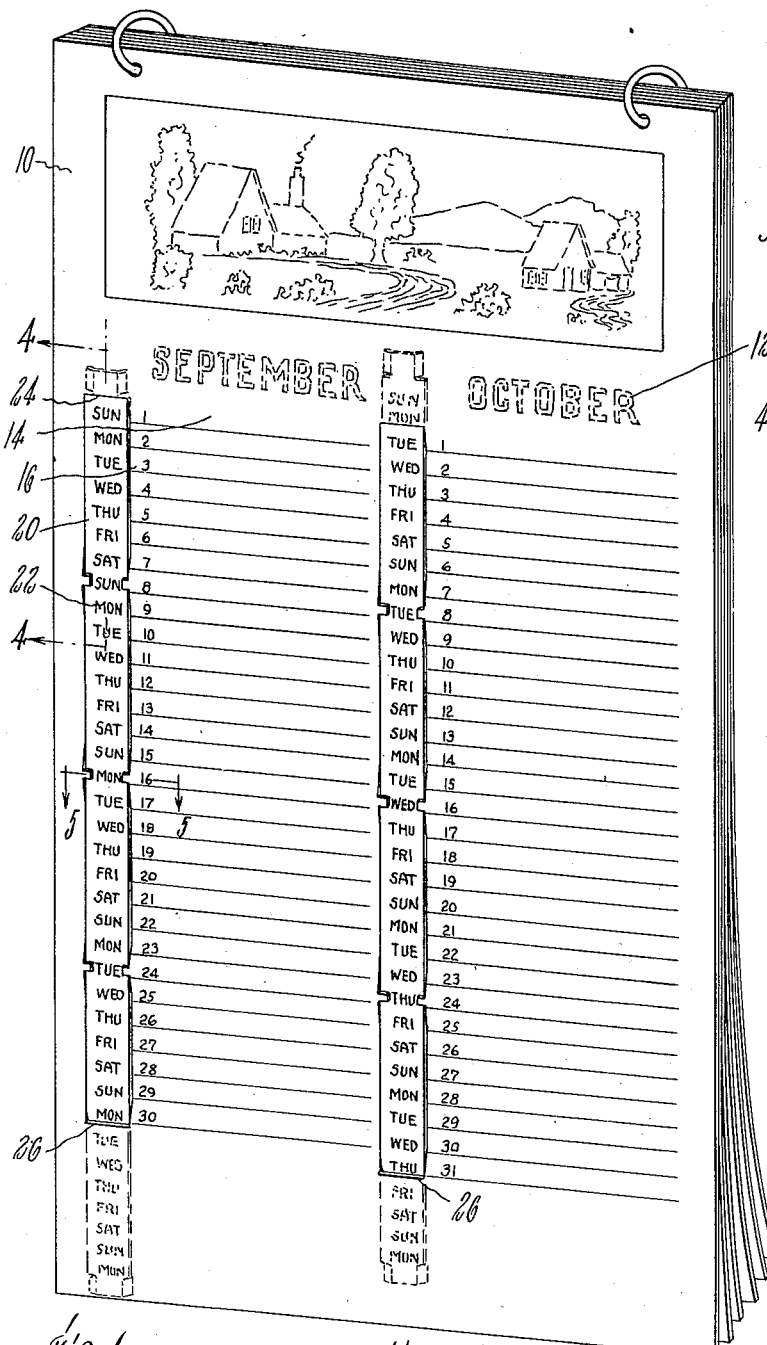
Figure 2:
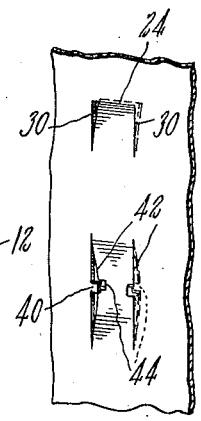
Fig. 2 is a fragmentary view of one of the sheets shown in Fig. 1.
Figure 3:
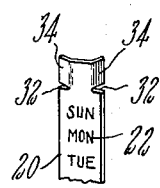
Fig. 3 is a fragmentary view of one of the strips shown in Fig. 1.
Figure 4:
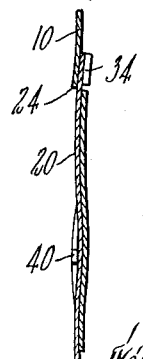
Fig. 4 is a section on the line 4—4 of Fig. 1.
Figure 5:
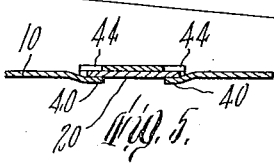
Fig. 5 is a section on the line 5—5 of Fig. 1.

The invention may be embodied in various ways according to the number of months represented on each sheet. In the calendar illustrated on the drawing, six sheets are provided each of which has two months represented thereon. Similarly, twelve sheets each having one month could be provided, or four or three sheets could be provided, such sheets having three or four months each thereon, respectively.

Referring to Fig. 1, the top sheet 10 is shown with a pictorial sketch for a heading and the names 12 of two successive months printed thereon side-by-side beneath the heading. Below the name of each month is a series of blank spaces 14 for memoranda such as anniversaries and the like. At the left of these spaces is a column 16 of consecutive figures representing the days of the month indicated at the top of the column. At the left of the column of figures 16 and in juxtaposition thereto is an elongated strip 20 which is slidably mounted on the front face of the sheet 10 so that it can be longitudinally adjusted. On the front face of the strip 20 are indicia 22 representing the days of the week in repeated sequence, the spacing of these indicia being similar to the spacing of the figures in the column 16, so that when the strip 20 is properly adjusted, one of the indicia 22 will be opposite a corresponding figure in the column 16 to indicate the week day of each day of the month represented by the figures in the column 16. The strip 20 is preferably arranged so that a sufficient length of it is exposed to extend alongside of the entire column of figures 16, the end portions of the strip being concealed behind the sheet 10. To this end, the sheet is transversely cut, as at 24 and 26, to permit the end portions of the strip to project through the sheet to the back face thereof. From the ends of each of the cuts 24 and 26 parallel cuts 30 may extend at right angles to the transverse cuts so as to make easier openings for the strip and prevent binding of the strip in the cuts 24 and 26. The end portions of the strip may be slit, as at 32, these slits forming a pair of ears 34 which may be bent outwardly from the plane of the strip to form stops adapted to engage the edges of the cuts 24 and 26 to limit the extent of sliding movement of the strip. It is evident that, in order to provide for all necessary adjustments of the strip with reference to the column of figures 16, the length of the strip must be sufficient to accommodate a full week of indicia in addition to the indicia exposed at any one time between the cuts 24 and 26.

In order to hold the mid-portion of the strip 20 against the front face of the sheet 10, a plurality of retaining elements, here shown as tongues 40, may be provided. These tongues may be formed in any preferred manner. For example, separate elements may be secured to the sheet. As shown, however, pairs of substantially parallel cuts 42 are made in the sheet along the side edges of the strip 20, with spaces between them approximately equal to the width of the strip but enough wider to admit the strip between them when the intervening substance of the sheet is sprung backward. Each of these cuts is formed with a jog 44 at or near its mid-point, resulting in tongues 40 which are integral with the sheet itself. The cuts 42 permit the tongues to be sprung sufficiently forward to receive the margins of the strip thereunder without excessive bending at their junctions with the sheet, and permit the substance of the sheet between the cuts to be sprung backward. The edges formed in the sheet by the cuts 42 embrace the strip above and below the tongues and constitute guides by which the strip is restrained from lateral shifting, while the tongues hold the strip close to the sheet and between these edges. The natural resilience of the material of the sheet is such as to hold the strip frictionally in any position of adjustment. It is to be understood that a similar strip is provided for each of the other months of the calendar. The strip 20 might be kept in place by strips or bridges extending entirely across its face in locations corresponding generally to those of the tongues, but positioned between figures and days of the week so as not to mask the lettering or figures; and such bridging or connecting strips for the strip 20 are to be considered as the equivalents of the tongues 40.

It is evident that various modifications and changes may be made in the structural details of the invention herein shown and described without departing from the spirit or scope thereof as defined in the following claims.

I claim:

1. A perpetual calendar comprising a sheet having thereon a column of figures representing the days of a month, a strip longitudinally slidable on said sheet and arranged along one side of said column, said sheet having cuts therethrough forming members arranged to overlap the side edges of said strip, said sheet having also a pair of transverse slits through which the upper and lower end portions of the strip project through to the back side of the sheet, means on the ends of said strip to limit the extent of sliding movement thereof, and indicia on said strip representing the days of the week in repeated sequence and spaced to correspond to the figures in said column.

2. A perpetual calender comprising a sheet having thereon a column of figures representing the days of a month, a strip longitudinally slidable on said sheet and arranged along one side of said column, said sheet having a plurality of pairs of substantially parallel vertical cuts along the sides of said strip, each said cut having at its middle a jog forming a tongue adapted to lap over a side edge of the strip, said sheet also having a pair of transverse cuts through which the end portions of the strip project to the back of the sheet at points adjacent to the ends of said column, outwardly bent ears on said strip at the ends thereof cooperating with said transverse cuts to limit the sliding movement of the strip, and indicia on said strip representing the days of the week in repeated sequence spaced in correspondence with the figures of said column.

3. A perpetual calendar comprising a sheet bearing a series of characters representing the days of the month in consecutive order, and a strip associated with said sheet in parallel relation to said series of characters, bearing indicia representing the days of the week spaced along the strip at intervals equal to the intervlas between successive characters on the sheet; said sheet having substantially parallel cuts extending side by side lengthwise of the strip and adjacent to the opposite side edges thereof, said cuts being spaced apart by a distance substantially equal to the width of the strip but enough greater than such width to admit the strip between the edges formed in the sheet by the cuts when the sheet substance between them, and the overlying portion of the strip, are sprung rearward, and when the flanking portions of the sheet are sprung forward, and the sheet being also provided with retaining portions disposed so as to overlap the lateral margins of the last-mentioned portion of the strip.

4. A perpetual calendar comprising a sheet having thereon a column of figures representing the days of a month, an elongated strip longitudinally slidable on said sheet and arranged with a portion of its front face equal in length to said column of figures exposed in juxtaposition to said column and with its end portions concealed behind the sheet, means overlapping at intervals the side margins of said exposed portion for guiding said strip and maintaining it slidably against the face of the sheet, means on the concealed ends of the strip for limiting its extent of sliding movement on said sheet, and indicia on said strip representing the days of the week in repeated sequence spaced similarly to the spacing of the figures in said column.

RALPH H. WILBUR.